(12) United States Patent
Toklu et al.

(10) Patent No.: US 6,549,643 B1
(45) Date of Patent: Apr. 15, 2003

(54) SYSTEM AND METHOD FOR SELECTING KEY-FRAMES OF VIDEO DATA

(75) Inventors: Candemir Toklu, Plainsboro, NJ (US); Shih-Ping Liou, West Windsor, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 09/449,889

(22) Filed: Nov. 30, 1999

(51) Int. Cl.[7] ................................................ G06K 9/00
(52) U.S. Cl. ........................ 382/107; 382/171; 382/173; 348/207; 348/231; 348/422; 348/700; 348/571; 364/419.08; 345/723; 358/906; 358/909.1
(58) Field of Search ................................ 382/171, 173; 345/723; 348/700, 422, 207, 231, 571; 364/419.08; 358/906, 909.1

(56) References Cited

U.S. PATENT DOCUMENTS

| | | | |
|---|---|---|---|
| 5,635,982 A | * 6/1997 | Zhang et al. | 348/231.99 |
| 5,805,746 A | * 9/1998 | Miyataka et al. | 348/642 |
| 5,915,250 A | * 6/1999 | Jain et al | 707/100 |
| 5,956,026 A | * 9/1999 | Ratakonda | 345/723 |
| 5,969,772 A | * 10/1999 | Saeki | 348/699 |
| 6,331,859 B1 | * 12/2001 | Crinon | 345/619 |
| 6,381,363 B1 | * 4/2002 | Murching et al. | 382/164 |
| 6,389,168 B2 | * 5/2002 | Altunbasak et al. | 345/723 |
| 6,393,054 B1 | * 5/2002 | Altunbasak et al. | 345/440 |

OTHER PUBLICATIONS

Wayne Wolf, "Key Frame Selection by Motion Analysis", IEEE, 0–7803–3192–3/96, pp. 1228–1231.*
Michael J. Swain, "Indexing Via Color Histogram", IEEE, CH2934–8/90/0000/0390, pp. 390–393.*

* cited by examiner

*Primary Examiner*—Leo Boudreau
*Assistant Examiner*—Tom Y. Lu
(74) *Attorney, Agent, or Firm*—Donald B. Paschburg (57) ABSTRACT

A system and method for selecting key-frames to generate a content-based visual summary of video and facilitate digital video browsing and indexing, which provides a real-time approach for key-frame selection irrespective of the available computation power. A method for selecting key-frames according to one aspect of the present invention is based on quantifiable measures such as the amount of motion and behavior of curves defined statistically or non-statistically, i.e. by finding the monotonically increasing segments of a curve, instead of thresholding the statistically defined image dissimilarity measures. In one aspect of the present invention, a method for selecting key-frames from video data comprises the steps of: partitioning video data into segments; generating a temporal activity curve for dissimilarity measures based on one of frame differences, color histograms, camera motion, and a combination thereof, for each segment; and sampling the temporal activity curve to select at least one key-frame for each segment.

22 Claims, 6 Drawing Sheets

SYSTEM AND METHOD FOR SELECTING KEY-FRAMES OF VIDEO DATA

BACKGROUND

1. Technical Field

The present invention relates generally to digital video processing and analysis and, more specifically, to a system and method for selecting key-frames from video data based on quantifiable measures such as the amount of motion and/or color activity of the video data.

2. Description of Related Art

The use of digital video in many multimedia systems is becoming quite popular. Videos are playing an increasingly important role in both education and commerce. In addition to the currently emerging services such as video-on-demand and pay-television, a variety of new information services such as digital catalogues and interactive multimedia documents, including text, audio and video are being developed.

Some conventional digital video application, however, use time consuming fast forward or rewind methods to search, retrieve and obtain a quick overview of the video content. As such, methods are continuously being developed for accessing the video content, which present the visual information in compact forms such that the operator can quickly browse a video clip, retrieve content in different levels of detail and locate segments of interest. To enable time-efficient access, digital video must be analyzed and processed to provide a structure that allows the user to locate any event in the video and browse it very quickly.

In general, a widely used method to provide the aforementioned needs is to generate a video summary. Conventional video summarization methods typically include segmenting a video into an appropriate set of segments such as video "shots" and selecting one or more key-frames from the shots. A video shot refers to a contiguous recording of one or more video frames depicting a continuous action in time and space. In a shot, the camera could remain fixed, or it may exhibit one of the characteristic motions such as panning, tilting, or tracking. For most videos, shot changes or cuts are created intentionally by video/film directors. Since there are typically many images in a given video shot, it is desirable to reduce the number of such images to one or more key-frames to represent the content of a given shot.

Conventional methods for selecting key-frames may be broadly classified into three categories: uniform sampling, color and motion based methods. Conventional methods based on uniform sampling select the frame(s) at certain instances in the shot as key-frames for the shot. For instance, one common practice is to select only one frame as a key-frame, i.e., the nth frame of the video shot where n is predetermined (which is typically the first frame n=1), to represent content of the video shots. Generally speaking, in a video shot where object and/or camera motion, and visual effects are prominent, one representative image is typically not sufficient to represent the entire content in the video. As such, other conventional key-frame selection methods based on uniform sampling of the images select multiple key-frames within the video shot by selecting those frames that exist at constant time-intervals in a video shot. Irrespective of the content in the video shot, however, this method yields multiple key-frames. However, when the shot is stationary all the other key-frames except the first key-frame will be redundant.

The problem with the uniform sampling methods is that the viewer may be misguided about the video content when there is high motion and/or color activity in the shot due to the well-known uniform sampling problem, i.e. aliasing.

Conventional key-frame selection methods based on color typically employ histogram or wavelet analysis to find the similarity between consecutive frames in a video shot. For example, one conventional method involves comparing a current frame in the video shot with the previous key-frame in terms of the similarity of their color histograms or luminance projections starting from the first frame of the shot where this frame is selected as the first key-frame. The frame with a similarity value smaller than a predetermined threshold is selected as the next key-frame. The selection is terminated when the end of the shot is reached (see, "Efficient Matching and Clustering of Video Shots," by B. Liu, et al, Proc. IEEE ICIP, Vol. 1, pp. 338–341, Washington D.C., October, 1995.) A similar method uses chromatic features to compute the image similarity (see "A Shot Classification Method Of Selecting Effective Key-Frames For Video Browsing," by H. Aoki, et al, Proc. ACM Multimedia, pp., 1–10, Boston, Mass., November, 1996.

One problem with histogram-based methods is that they typically fail to select key-frames when the spatial layout of the content changes while the histogram remains constant. As such, other conventional methods use wavelet coefficients or pixel-based frame differences to compute the similarity between frames to handle spatial layout problem.

Another conventional key-frame selection method disclosed in U.S. patent application Ser. No. 5,635,982 entitled: "System For Automatic Video Segmentation and Key Frame Extraction For Video Sequences Having Both Sharp and Gradual Transitions." With this method, starting from the first frame in the shot, the frame is compared with the rest of the frames in the shot until a significantly different frame is found, and that image is selected as a candidate against which successive frames are compared. The method suggest using one of the following metrics: color, motion or hybrid (color and motion combined), to compute the frame similarity. Another conventional method disclosed in U.S. Pat. No. 5,664,227 entitled: "System and Method For Skimming Digital Audio/video Data" employs a statistical change detection method that uses DCT (discrete cosine transform) coefficients of the compressed images as a similarity measure to select multiple key-frames in a video shot. This method also requires selection a threshold.

All the above methods use some form of statistical measure to find the dissimilarity of images and heavily depend on the threshold selection. One problem associated with such an approach is that selecting the appropriate threshold that will work for every kind of video is not trivial since these thresholds cannot be linked semantically to events in the video, but rather only used to compare statistical quantities. Although domain specific threshold selection is addressed in some of these conventional methods, the video generation techniques change over time. Yet there is a vast amount of sources in every domain. In addition color based similarity measures cannot quantify the dynamic information due to the camera or object motion in the video shot.

Conventional key-frame selection methods that are based on motion are better suited for controlling the number of frames based on temporal dynamics in the scene. In general, pixel-based image differences or optical flow computation are typically used in motion based key-frame selection methods. For instance, in one conventional method, a cumulative average image difference curve is sampled non-uniformly to obtain multiple key-frames (see "Visual Search in a Smash System" by R. L. Lagendijk, et al, Proc. IEEE ICIP, pp. 671–674, Lausanne, Switzerland, September 1996. This method, however, requires the pre-selection of the number of key-frames for a video clip. Another method uses optical flow analysis to measure the motion in a shot and select key-frames at the local minima of motion (see "Key Frame Selection By Motion Analysis," by W. Wolfe, Proc. IEEE ICASSP, pp. 1228–1231, Atlanta Ga., May, 1996). Another conventional method involves using the cumulative amount of special motions for selection (see "Scene Change Detection and Content-based Sampling Of Video Sequences," by B. Shahraray, Proc. SPIE Digital Video Compression" Algorithms and Technologies, Vol. 2419, pp. 2–13, San Jose, Calif., February, 1995). Motion based key-frame selection methods model the temporal changes of the scene with motion only.

It is believed that that a good key-frame selection method is the one that can 1. exploit the dynamic information contained in videos due to camera and/or object motion, and visual effects to pick several key-frames as static image representations of the video to enhance the summary generation,
2. achieve a good balance preserving as much of the visual content and temporary dynamics in the shot as possible and minimize the number of key-frames needed for an efficient visual summary, and
3. adjust the performance according to the available computation power.

Accordingly, a key-frame selection process is desired that (1) combines the motion and color based key-frame selection methods and generalizes the solution without the need for statistically defined dissimilarity measures and, thus, highly sensitive threshold selection, and that (2) provides non-uniform sampling to overcome the aforementioned aliasing problems by selecting more frames when the color and motion activity is high, and less frames otherwise.

SUMMARY OF THE INVENTION

The present invention provides a system and method for selecting key-frames to generate a content-based visual summary of video and facilitate digital video browsing and indexing. This method is aimed at providing a real-time approach for key-frame selection irrespective of the available computation power. A method for selecting key-frames according to one aspect of the present invention is based on quantifiable measures such as the amount of motion and behavior of curves defined statistically or non-statistically, i.e. by finding the monotonically increasing segments of a curve, instead of thresholding the statistically defined image dissimilarity measures.

In one aspect of the present invention, a method for selecting key-frames from video data comprises the steps of: partitioning video data into segments; generating a temporal activity curve for dissimilarity measures based on one of frame differences, color histograms, camera motion, and-a combination thereof, for each segment; and sampling the temporal activity curve to select at least one key-frame for each segment.

In another aspect of the present invention, a temporal activity curve for dissimilarity measures based on frame differences is generated by computing an average of an absolute pixel-based intensity difference between consecutive frames in each segment and, for each segment, computing a cumulative sum of the average of the absolute pixel-based intensity differences for the corresponding frames of the segment. The key-frames in each segment are then selected by selecting the first frame in each motion activity segment of a given segment as a key-frame, if the cumulative sum of the average of the absolute pixel-based intensity differences for the frames of the given segment does not exceed a first predefined threshold; and selecting a predefined number of key-frames in the given segment uniformly, if the cumulative sum of the average of the absolute pixel-based intensity differences for the frames of the given segment exceeds the first predefined threshold.

In yet another aspect of the present invention, a temporal activity curve for dissimilarity measures based on camera motion is generated for each segment by estimating camera motion between consecutive frames in a given segment; computing a motion activity curve based on the estimated camera motion for the given segment; and computing a binary motion activity curve by comparing the motion activity curve to a second predefined threshold on a frame-by-frame basis. Preferably, the camera motion is estimated by estimating motion parameters such as zooming, rotational, panning, and tilting. The key-frames of a given segment are then selected by smoothing the binary motion activity curve of the given segment to detect motion activity segments within the given segment, selecting the first and last frame of each motion activity segment as a key-frame; and for each motion activity segment of the given segment, cumulatively summing the estimated camera motion of each frame and selecting at least one additional frame in each motion activity segment as a key-frame if the cumulative sum of the estimated camera motion exceeds a third predefined threshold.

In another aspect of the present invention, a temporal activity curve for dissimilarity measures based on color histograms is generated by computing a color histogram of each frame of a given segment; computing a moving average histogram of the given segment using the computed color histograms for each frame; generating a color histogram activity curve by computing a distance between the color histogram of each frame and the moving average histogram; and computing a binary color histogram activity curve by comparing a change in value of the color histogram activity curve between each consecutive frame of the given segment to a fourth predefined threshold value. The key-frames of a given segment are then selected by smoothing the binary color histogram activity curve to detect color histogram activity segments; and selecting at least one representative frame (preferably the first frame) of each color histogram activity segment as a key-frame for the given segment.

In yet another aspect of the present invention, the key-frame selection process comprises the step of eliminating selected key-frames in each segment that are visually similar. The key-frame elimination process is based on a comparison between histograms of the selected key-frames and/or a comparison of the spatial layout of the selected key-frames.

These and other objects, features and advantages of the present invention will be described or become apparent from the following detailed description of preferred embodiments, which is to be read in connection with the accompanying drawings.

DETAILED DESCRIPTION OF PREFERRED EMBODIMENTS

It is to be understood that the system and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD ROM, ROM and Flash memory), and executable by any device or machine comprising suitable architecture. It is to be further understood that since the constituent system modules and method steps depicted in the accompanying Figures are preferably implemented in software, the actual connections between the system components (or the flow of the process steps) may differ depending upon the manner in which the present invention is programmed. Given the teachings herein, one of ordinary skill in the related art will be able to contemplate these and similar implementations or configurations of the present invention.

Figure 1:
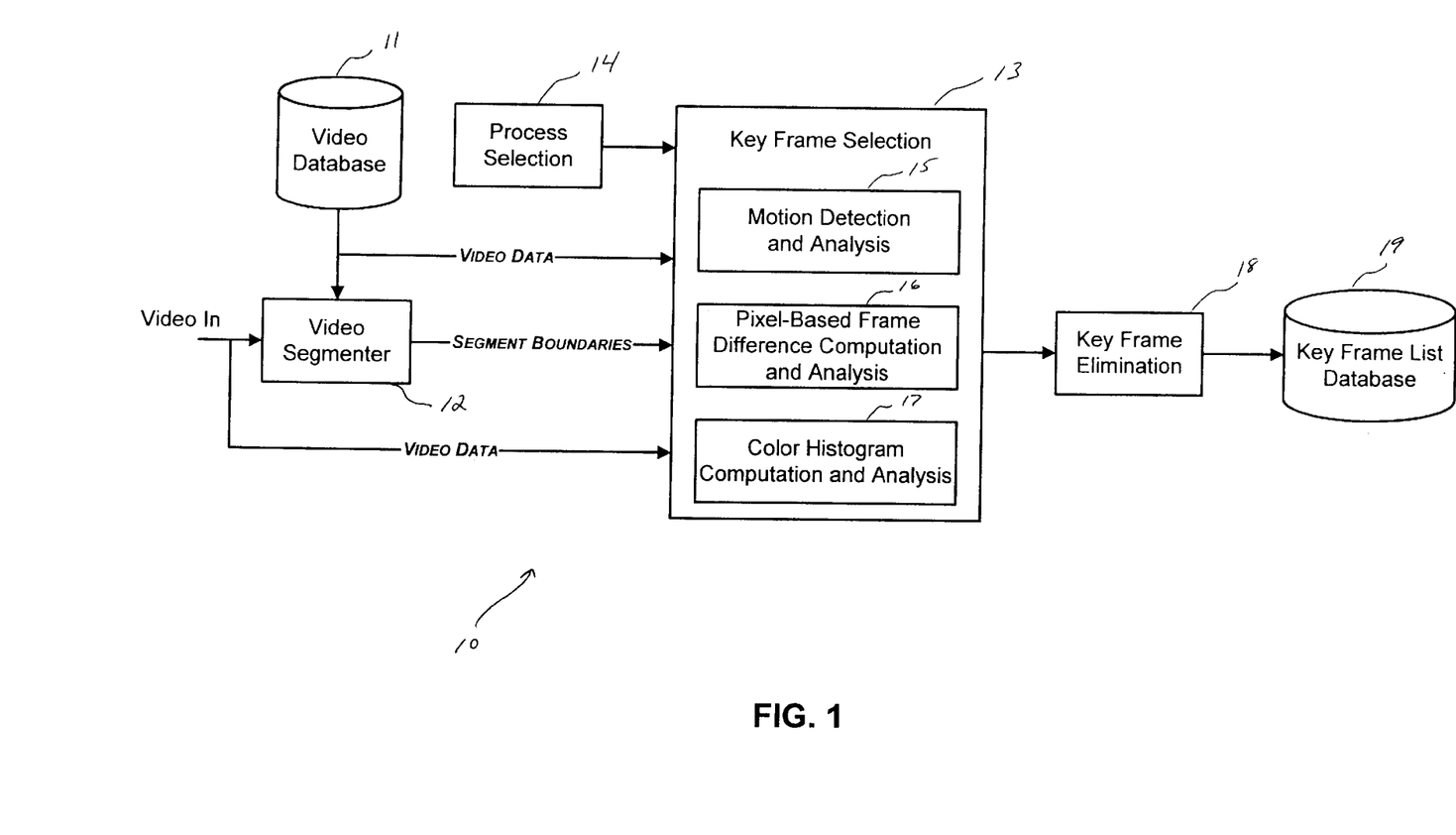
FIG. 1 is a block diagram of a video processing system for selecting key-frames from video data according to an embodiment of the present invention.

Referring to FIG. 1, a block diagram illustrates a system for selecting key-frames from video data according to an embodiment of the present invention. The system 10 may be employed in any video processing system for generating a content-based visual summary of video to facilitate, e.g., digital video indexing and browsing. The system 10 provides a real-time approach for key-frame selection irrespective of the available resources (such as processing power and memory) of the machine or device in which the system operates.

The system 10 comprises a video database 11 for storing video data such as one or more video files. A video segmentation module 12 partitions a video file (that is either retrieved from the database 11 or input in real-time as a video data stream) into a plurality of video segments (or video segments) and then outputs segment boundary data corresponding to the input video data. It is to be understood that any conventional process may be employed herein for partitioning video data which is suitable for implementation with the present invention. In a preferred embodiment, the video segmentation module 12 implements the cut detection method disclosed in U.S. Pat. No. 5,835,163 to Liou et al., issued on Nov. 10, 1998, entitled "Apparatus For Detecting A Cut In A Video," which is commonly owned and incorporated herein by reference. The above-incorporated cut detection method partitions video data into a set of "shots" comprising visually abrupt cuts or camera breaks. As stated above, a video "shot" represents a contiguous recording of one or more video frames depicting a continuous action in time and space. The above-incorporated cut detection method segments video data into shots using an integrated pixel-based difference metric (discussed below) and distribution-based difference metric.

The input video data and corresponding segment boundaries are input to a key-frame selection module 13 wherein key-frames of each video segment (or shots) are selected using one or more key-frame selection techniques according to the present invention. As described in further detail below, key-frame selection methods according to the present invention comprise computing and analyzing camera motion between consecutive frames via a motion detection and analysis module 15, computing the average pixel-based absolute frame differences between consecutive frames via a pixel-based frame difference computation and analysis module 16, and/or computing a color histogram of each frame via a color histogram computation and analysis module 17.

The system 10 comprises a key-frame process selection module 14 that allows one or more of the key-frame selection processes 15, 16, 17 to be selected in accordance with the computational power and resources of the system. The process selection module 14 may either operate automatically by the system 10 determining the available resources and selecting the appropriate process (or processes) or manually by user-selection.

In accordance with an exemplary embodiment of the present invention, four operating levels are provided, A, B, C and D. In the exemplary embodiment described below, operating level A denotes the pixel-based frame difference computation process (which requires the least amount of computational power), operating level C denotes the color histogram computation process (which requires the next largest amount of computational power), operating level B denotes the motion estimation process (which requires the next largest amount of computational power) and operating level D denotes a combination of the motion estimation and color histogram computation processes (which requires the largest amount of computational power).

For each video segment, the key-frame selection module 13 outputs a plurality of video frames that represent key-frames for the video segments. These key-frames are then processed by a key-frame elimination module 18 to eliminate key-frames that are visually similar. The key-frame elimination process is described in detail below.

The output of the key-frame elimination module 18 is list of key-frames, e.g., keyframelist, for each video shot. The key-frame list may be stored in a key-frame list database 19. The key-frame lists may be used by video processing/indexing systems as components for, e.g., multimedia and/or video summarization.

Figure 2A:
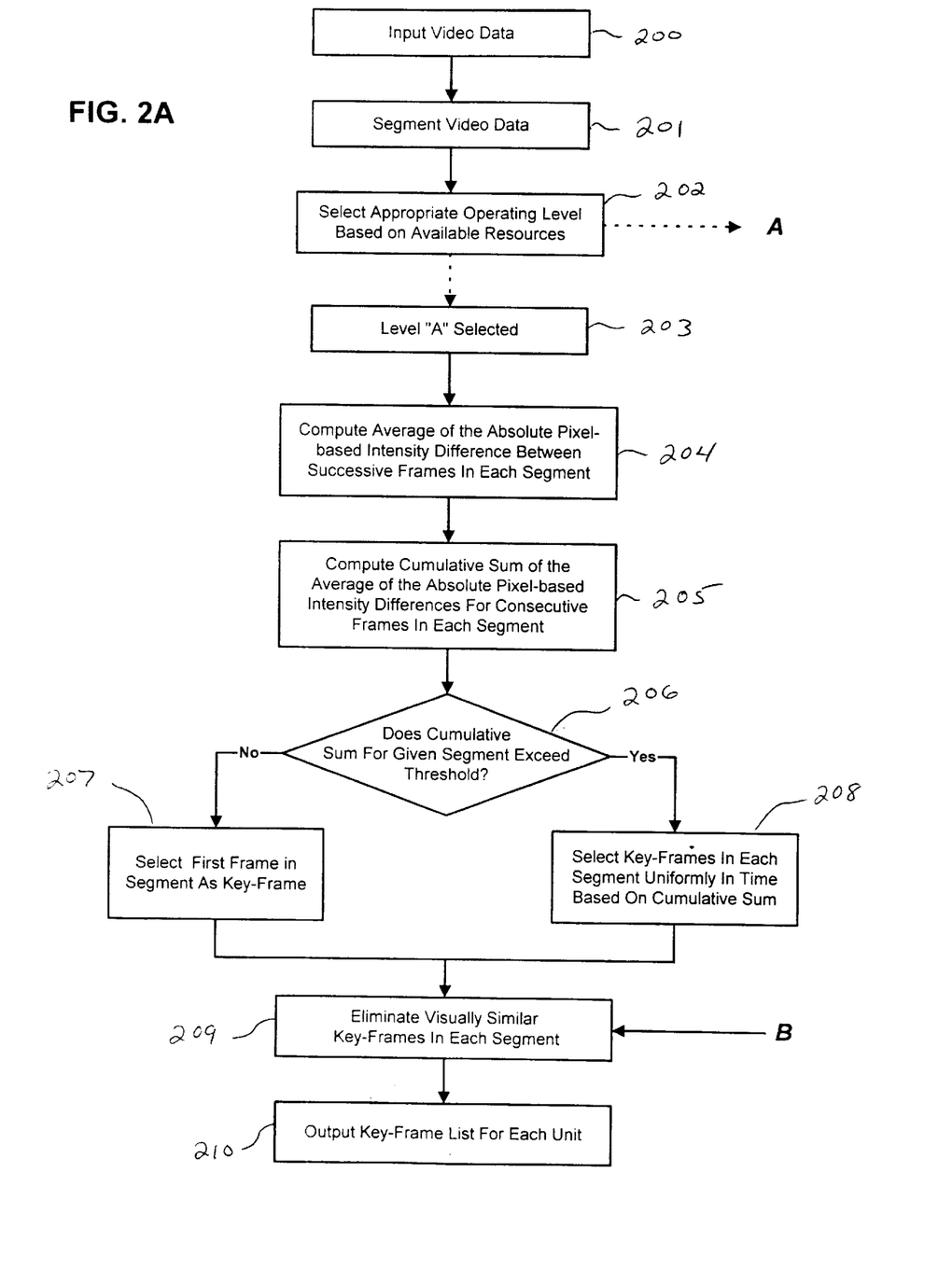
FIGS. 2A, 2B and 2C comprise a flow diagram illustrating various methods for selecting key-frames from video data according to the present invention.
Figure 2B:
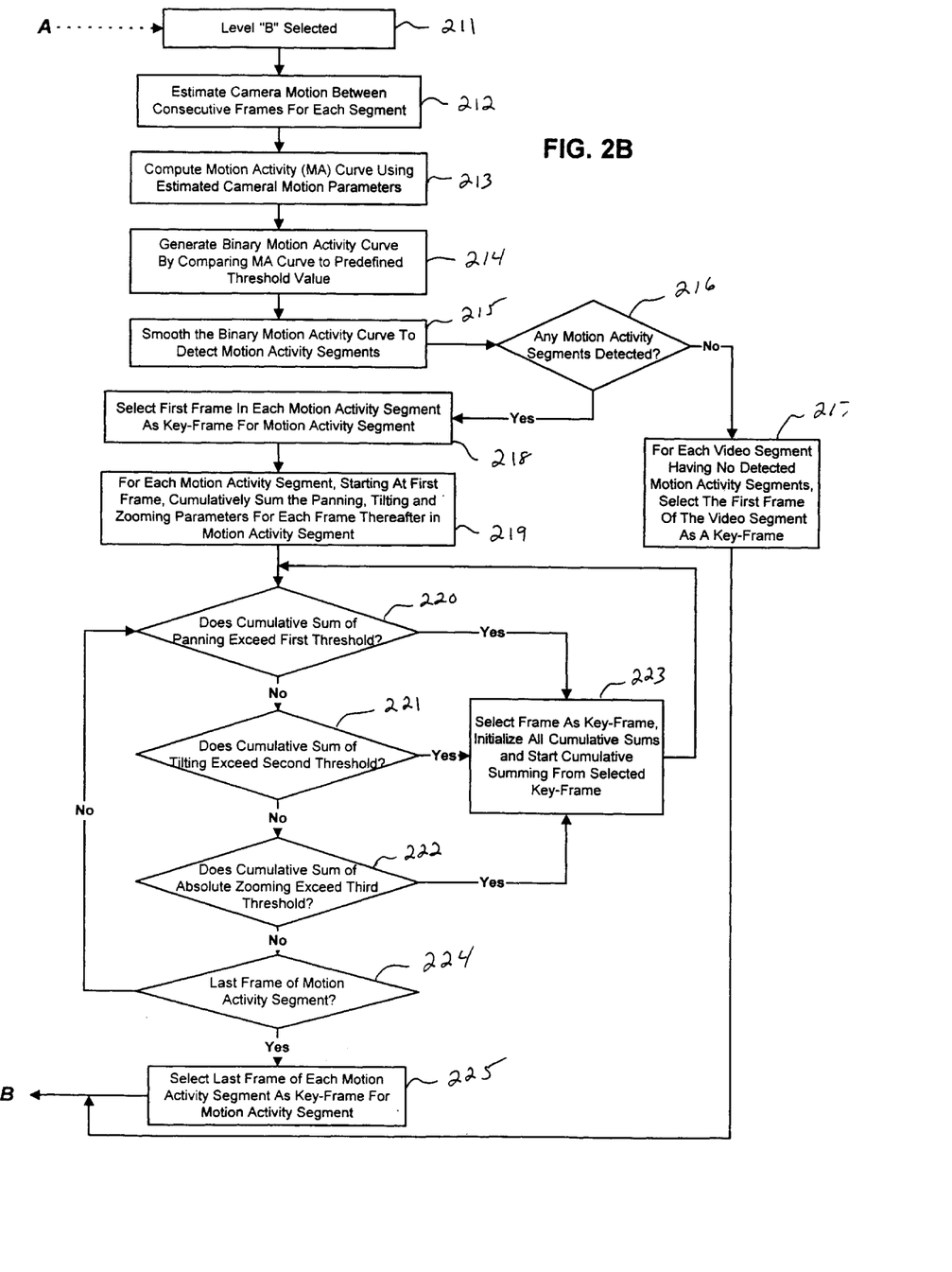
Figure 2C:
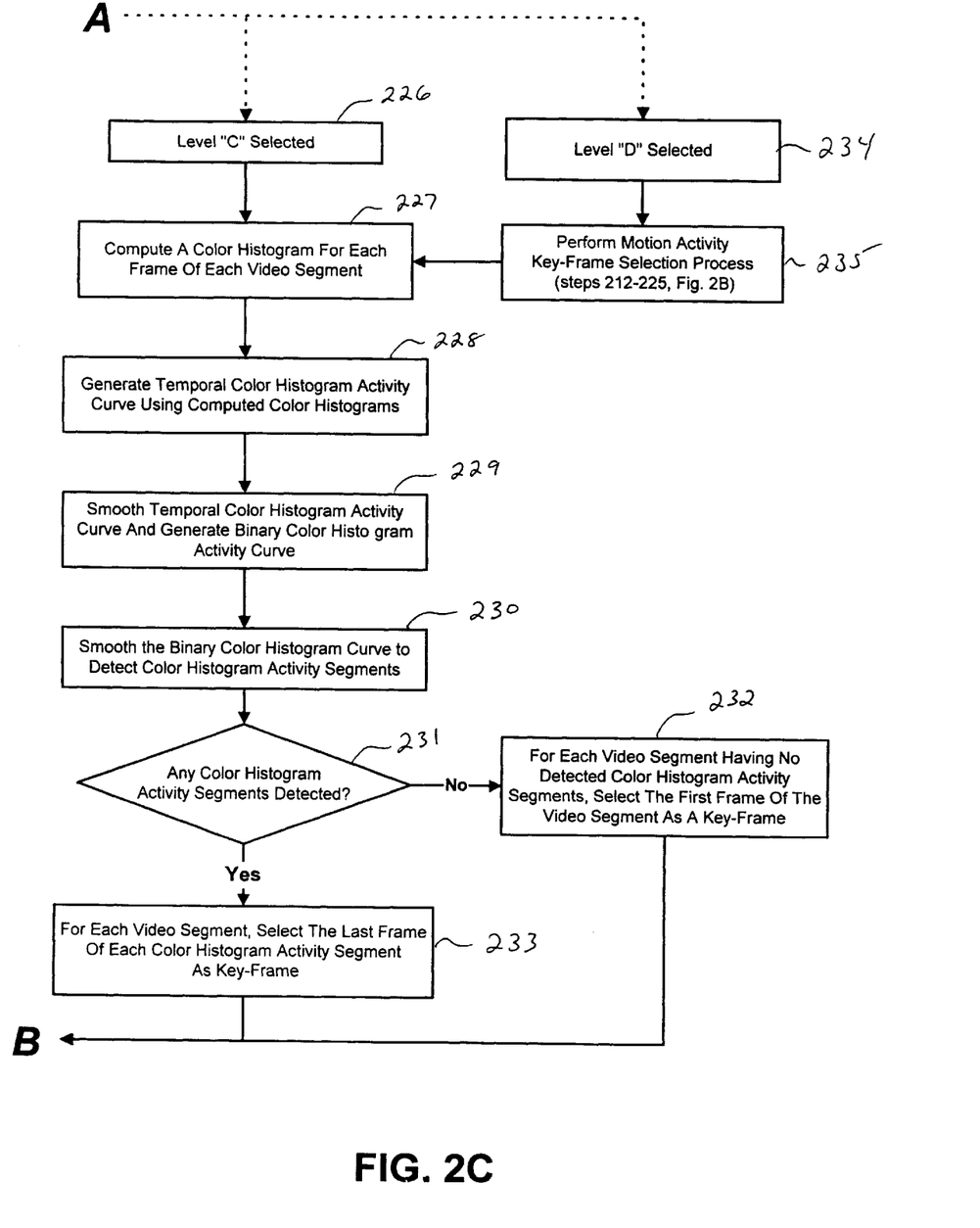

An exemplary method of operation of the system of FIG. 1 according to the present invention will now be explained in detail with reference to the flow diagrams of FIGS. 2A, 2B and 2C. More specifically, the flow diagrams of FIGS. 2A, 2B and 2C illustrate various key-frame selection processes according to different levels of operation (e.g., levels A, B, C and D as noted above). It is to be understood that the following description of the combination of operating levels and key-frame methods are for purposes of illustration and that other combinations of key-frame selection methods and operation levels may be envisioned by those skilled in the art.

Referring to FIG. 2A, video data (e.g., a video/multimedia file, video data stream, etc.) is input to the system 10 (step 200) and then partitioned into a plurality of video segments (step 201). As stated above, the video data is preferably segmented into video shots using the cut detection method described in the above-incorporated U.S. Pat. No. 5,835,163.

Next, an appropriate operating level (e.g., level A, B, C or D) is selected based on, e.g., the available resources of the system (step 202). If operating level A (lowest level) is selected (step 203), a pixel-based frame difference key-frame selection process is employed for selecting key-frames from each video segment of the video data. More specifically, this process initially involves selecting a representative video frame to begin processing (e.g., the first frame in the shot), and then computing an average of the absolute pixel-based intensity difference between consecutive frames in each video shot (step 204). In a preferred embodiment, the average pixel-based frame difference between successive frames is computed using a pixel-based difference metric (PD) (as described in the above-incorporated shot detection method) defined as:

$$PD(t) = \frac{1}{N} \sum_{(x,y) \in S} |I(t, x, y) - I(t-1, x, y)|, \quad t_f \geq t \geq t_i \qquad \text{Eqn. 1}$$

where $t_i$ and $t_f$ are the starting and ending frame number, respectively, of a given video segment (determined from the segment boundary data), N denotes the total number of pixels in every frame of the video, S represents the two dimensional image plane, and I(t,x,y) represents the pixel intensity value at location x,y in the image plane S at a given time t.

Given PD(t), the next step is to generate a temporal activity curve representing dissimilarity measures as a function of time based on the computed frame differences (Eqn. 1). In a preferred embodiment, a temporal activity curve is generated by computing a cumulative sum of the average of the absolute pixel-based intensity differences between consecutive frames in a given segment (step 205) as follows:

$$CD(t) = \frac{1}{t_f - t_i + 1} \sum_{t_i}^{t} PD(t), \quad t_f \geq t > t_i \text{ and } CD(t_i) = 0 \qquad \text{Eqn. 2}$$

The next step is to determine if the total cumulative sum $CD(t_f)$ for a given segment exceeds a predefined threshold (step 206). If the cumulative sum does not exceed the threshold (negative result in step 206), then the first frame of the given segment is selected as the key-frame for that segment (step 207). On the other hand, if the cumulative sum for the given segment does exceed the threshold (affirmative result in step 206), then the CD(t) curve is sampled uniformly to select one or more key-frames based on the measured cumulative sum of the frame differences (step 208). More specifically, this step involves selecting key-frames by uniformly dividing the extent of the computed cumulative sum of frame difference curve. By way of example, assume that the predefined threshold is set to 15. Assume further that the total cumulative sum of the frame difference for a given shot is $CD(t_f)>15$, then a certain number of frames K>1 may be selected as key-frames for the given shot. In a preferred embodiment, the value of K is 6 and may be user-defined. The i th key-frame is selected at time t, where:

$$CD(t) = i \frac{CD(t_f)}{K} \text{ for } i = 0, \ldots, K-1. \qquad \text{Eqn. 3}$$

After the key-frames have been selected (steps 207 or 208) for each segment, a key-frame elimination process according to the present invention is performed (step 209) to eliminate the selected key-frames that are visually similar. Several embodiments of the key-frame elimination process according to the present invention are described in detail below with reference to the flow diagrams of FIGS. 3 and 4. After the key-frame elimination process, the remaining key-frames for each segment are output in a key-frame list (step 210).

Referring now to FIG. 2B, if operating level B is selected (step 211), a motion activity detection and analysis will be performed for selecting key-frames. A preferred method for selecting key-frames within a given video shot based on motion detection proceeds as follows. The first step is to estimate camera motion between consecutive frames in the video for each segment (step 212). It is to be appreciated that camera (dominant) motion information is useful in the analysis of shots because camera motions often explicitly reflect the communication intentions of the director. In addition, dominant motion detection is useful for constructing still images (as described in "Salient Video Stills: Content and Context Preserved," by Teodosio et al., in *Proceedings of the ACM Multimedia*, pp. 29–46, Anaheim, Canada, 1993), and, thus, effectively representing video content.

In accordance with a preferred embodiment of the present invention, dominant motion is classified into four groups: panning, tilting, zooming and rotational motion. Panning and tilting motion in a video sequence respectively result from horizontal and vertical camera rotation, or transverse or lateral movement, respectively. The zooming motion results from focal length change and the rotational camera motion results from rotating a camera around its image plane axis. These motions can also be present in combination in video sequence. These camera motions may be modeled by the following 2-D spatial transformation:

$$\begin{bmatrix} u \\ v \end{bmatrix} = \begin{bmatrix} z\cos(\theta) & -z\sin(\theta) \\ z\sin(\theta) & z\cos(\theta) \end{bmatrix} \begin{bmatrix} x \\ y \end{bmatrix} + \begin{bmatrix} t_x \\ t_y \end{bmatrix} \qquad \text{Eqn. 4}$$

where $$\begin{bmatrix} x \\ y \end{bmatrix} \text{ and } \begin{bmatrix} u \\ v \end{bmatrix}$$

denote 2-D coordinates with respect to the image plane center, and where z, 2, and $t_x$ and $t_y$ denote the zooming, rotational, panning and tilting motion parameters, respectively. The problem of estimating these motion parameters is formulated as the model-based robust maximum likelihood estimation. We minimize the following objective function:

$$\sum_{(x,y) \in S} \rho(I_x d_x + I_y d_y + I_t; \sigma) \qquad \text{Eqn. 5}$$

where $I_x$, $I_y$ and $I_t$ denote the horizontal, vertical and temporal image gradients, where $d_x = u - x$, and $d_y = v - y$ denote the horizontal and vertical displacements, respectively (where x, y, u, and v are defined as in Eqn. 4), and where S represents the image plane. The function $\rho$ (r; $\sigma$) is the objective function defined over the optical flow residuals, $r = I_x d_x + I_y d_y + I_t$, with a given scale factor $\sigma$, and is defined as:

$$\rho(r; \sigma) = \frac{r^2}{\sigma^2 + r^2} \qquad \text{Eqn. 6}$$

This objective function is also known as the German-McLure function. The scale factor $\sigma$ is preferably set to 15 and is independent of the frame size.

Preferably, the objective function (Eqn. 5) is minimized for every consecutive frame pair in the shot using the iterative method described in "The Robust Estimation Of Multiple Motions" Parametric and Piecewise-Smooth Flow Fields,", by M. J. Black et al., *Computer Vision and Image Understanding*, Vol. 63, No. 1, pp. 75–104, January, 1996, which is incorporated herein by reference. To compute motions of varying magnitudes, the images are represented at multiple scales using Laplacian pyramids. The objective function is minimized iteratively at any level until either the change in parameters $z$, $\theta$, $t_x$ and $t_y$ is below a threshold or a specified number of iterations is reached. The estimated parameters are projected to the next finer level and used as the initial estimates, and the process is repeated until the convergence at the finest level.

It is to be understood that the other robust camera motion estimation methods known to those skilled in the art may be employed herein.

After the camera motion parameters are estimated, the next step generally involves generating a temporal activity curve representing dissimilarity measures as a function of time based on the estimated camera motions to detect motion activity segments with significant camera motion in each shot. More specifically, according to a preferred embodiment, for each frame in the shot, a temporal activity curve (or motion activity (MA) curve) is generated using the estimated motion parameters (step 213) (e.g., the estimated zooming, rotational, panning and tilting motion parameters ($z$, $\theta$, $t_x$ and $t_y$)) as follows:

$$MA = \sqrt{t_x^2 + t_y^2 + \frac{1}{N^2} \sum_{(x,y) \in S} (z\cos(\theta)x - z\sin(\theta)y + t_x)^2 + (z\sin(\theta)x + z\cos(\theta)y + t_y)^2} \quad \text{Eqn. 7}$$

where N denotes the total number of pixels in every frame.

The temporal MA curve is then reduced to a Binary MA curve by comparing the MA curve to predefined threshold on a frame-by-frame basis (step 214) to detect frames having significant motion (motion activity segments within the shot). More specifically, for each frame in a given shot, the MA curve is compared to a predefined threshold that is preferably set to 0.5 pixels. The computed MA value for a given frame in the shot is set to "1" if the MA value for the frame is greater than the predefined threshold. On the other hand, the computed MA value for a given frame in the shot is set to "0" if the MA value for the frame is less than or equal to the predefined threshold value. It is to be appreciated that in contrast to conventional methods that are based on statistical image dissimilarity measures, the present method is based on the motion amount, which is a quantitative measure.

Next, the binary MA curve is smoothed to detect what is referred to herein as "motion activity segments" (step 215). Motion activity segments refer to long segments in the shot with significant motion. The following is a preferred method for smoothing the binary MA curve, wherein the terms "hill" and "hole" respectively refer to 1 and 0. The first step of the smoothing process is to eliminate the holes that are less than or equal to 3 frames long. Next, the binary MA curve is median filtered using a 7-tab filter (as is understood by those skilled in the art). The next step is to eliminate holes that are less than or equal to 15 frames long and finally, to eliminate the hills that are less than or equal to 15 frames long. The groups of frames of the binary MA curve that remain after the smoothing process are deemed motion activity segments within the shot. In particular, the remaining hills in the activity curve become the activity segments, i.e., the values of the binary motion activity curve for a number of consecutive frames (at least 15 frames) are equal to "1."

It is to be understood that the selected frame lengths in the above procedure are frame size independent. In particular, the temporal frame lengths (e.g., 3 frames for eliminating holes and 15 frames for eliminating hills and holes) are independent of the size of the frames where the camera motion is computed. To minimize computation, frames at a resolution of 180×120 can be used to compute the motion notwithstanding that the resolution of the frames in the video sequence may be 360×240.

Referring back to FIG. 2B, if after the smoothing process (step 215) no motion activity segments were detected for a given video segment (negative result in step 216), then the first frame of the given video segment is selected as the key-frame for that segment (step 217). Thus, each video segment having no detected motion activity segments will have the first frame as the selected key-frame.

On the other hand, if one or more motion activity segments were detected for a given video segment (affirmative result in step 216), then the next step, in general, is selecting key-frames for a given shot by sampling the MA curve (non-uniformly in time). More specifically, in a preferred embodiment, key-frames for a given shot are selected from each of the detected motion activity segments for the given shot as follows. Initially, the first frame of each motion activity segment of a given shot is selected as a key-frame (step 218). Next, additional key-frames are selected from each motion activity segment based on the amount of cumulative panning, tilting and zooming motion as follows. Starting at the first frame in a given motion segment, the process flow begins by cumulatively summing the panning, tilting, and zooming motion for every frame thereafter (step 219). When either the (1) cumulative sum for the panning motion exceeds a first predefined threshold (which is preferably two-thirds of the frame width) (affirmative result in step 220), (2) cumulative sum for the tilting motion exceeds a second predefined threshold (which is preferably two-thirds of the frame height) (affirmative result in step 221), or (3) the cumulative sum of the absolute value of the zooming motion exceeds a third predefined threshold (which is preferably 0.66) (affirmative result in step 222), then the current frame is selected as a key-frame for that motion activity segment, all the cumulative sums are reset to zero, and the cumulative sum is measured commencing from the selected frame (step 223). Hence, it is to be appreciated that every threshold that is selected has some quantitative meaning and can be linked semantically to the camera movement and/or frame size.

When the last frame of a given motion activity segment is reached (affirmative result in step 224), the last frame of the motion activity segment is selected as a key-frame for that motion activity segment (step 225). It is to be understood that this process (steps 218–225) is repeated for each of the motion activity segments of a given shot (as well as for each motion activity segments of each shot in the video data). Again, after all the motion activity segments for each shot have been processed, the key-frame elimination process (step 210, FIG. 2A, as described in detail below) is performed to eliminate key-frames that are visually similar.

Referring now to FIG. 2C, if operating level C is selected (step 226), a color histogram computation and analysis process is performed. Initially, a color histogram analysis process is performed which comprises computing a color histogram of each frame within a given video shot and generating a temporal activity curve over time for dissimilarity measures based on the computed color histograms. More specifically, in a preferred embodiment, the color histogram analysis process comprises selecting a representative frame in a given video shot (which is preferably the first frame) and starting from this representative frame, computing a color histogram H(t,j) for each frame t=$t_i$ . . . $t_f$ and j=1 . . . M in the shot (step 227), where $t_i$ and $t_f$ denote the starting and ending frame numbers of a given video shot, respectively, and where M denotes the total number of bins in the histogram (where M is preferably set to a value of 40). The histograms are preferably constructed using grey-scale images using conventional methods well-known to those skilled in the art.

One histogram computation process that may be employed herein is as follows. Let I(t,x,y) denote the intensity value of a frame in the video sequence at time t at location (x,y), where (x,y) denote a pixel in the two dimensional image plane S. In a digital video, the color of each pixel is represented as a three dimensional vector. Each dimension denotes a base color, namely, red, green and blue. Each base color takes values from 0 to 255 (assuming each color is represented by 8 bits). Therefore, 24 bits represents one pixel. Assuming there is a one-to-one mapping from 24 dimensional vector to integers between 1 to M values, where M is the number of bins in the histogram (as noted above). Let this mapping be denoted by G. After setting H(t,j)=0 for all j=1 . . . M, every pixel in the image plane S is traversed and the color at a given pixel, i.e., I(t,x,y), is mapped to its corresponding value, e.g., G(I(t,x,y))=j, where j is a value of 1 to M. Then H(t,j) is incremented by one. After all the pixels in the frame are traversed, each H(t,j) is divided by N for normalization purposes, where N is the total number of pixels in a frame. This an exemplary histogram computation process that may be employed herein.

Next, with continued reference to FIG. 2C, a temporal color histogram activity curve defining the color-based distance is generated for each video segment (step 228) by computing a distance between the color histogram of each frame with an average histogram in the given shot. In particular, a moving average histogram is computed as follows:

$$AH(t, j) = \frac{1}{t_f - t_i + 1} \sum_{t_i}^{t} H(t, j).$$  Eqn. 8

Given the above moving average histogram AH(t,j), the temporal color histogram activity curve (which defines the color based difference) can be computed as follows:

$$HD(t) = \frac{1}{N} \sum_{j} \frac{(AH(t, j) - H(t, j))^2}{AH(t, j)}.$$  Eqn. 9

After the histogram analysis process (which results in the temporal color histogram activity curve), the next step is detecting histogram activity segments where the color histogram distance monotonically increases. The histogram activity detection process according to a preferred embodiment of the present invention comprises smoothing the temporal color histogram activity curve HD(t) and generating a binary color histogram activity curve from the smoothed temporal activity curve (step 229). In particular, the color based distance curve HD(t) is preferably smoothed using a 15 tab moving average filter:

$$\hat{HD}(t) = \frac{1}{15} \sum_{T=t-7}^{t+7} HD(T).$$  Eqn. 10

It is assumed in Eqn. 10 that HD(t)=HD($t_i$) for t<$t_i$ and HD(t)=HD($t_f$) for t>$t_f$. A binary color histogram activity curve can be computed from the smoothed temporal activity curve (Eqn. 10) as follows:

$$HA(t) =$$  Eqn. 11

$$\begin{cases} 1 & \text{if } (\hat{HD}(t) - \hat{HD}(t-1)) > T \\ 0 & \text{otherwise} \end{cases} \quad \text{for } t_f \exists t > t_i, \; HA(t_i) = 0$$

where T represents a predefined threshold value that is used to compare only the change between consecutive values in a time-based function. In a preferred embodiment, the threshold T is set as 0.005.

Next, histogram activity segments of the binary color histogram activity curve are selected by smoothing the binary color histogram activity curve to detect monotonically increasing segments of the distance curve (step 230). In particular, similar to motion segment detection process discussed above, the histogram activity segments may be determined as follows. First, holes that are less than or equal to 3 frames long are eliminated. Then the binary HA(t) curve is median filtered using a 7 tab filter. Finally, any holes that are less than or equal to 15 frames long are eliminated. The remaining hills in the activity curve become the color histogram activity segments.

If, after the smoothing process (step 230), there were no color histogram activity segments detected for a given video segment (negative result in step 231), then the first frame of the given video segment will be selected as a key-frame for that video segment (step 232).

On the other hand, if there were one or more color histogram activity segments detected for a given video segment (affirmative result in step 231), then the key-frames of the given video segment are chosen by selecting one frame of each color histogram activity segment in the shot as a key-frame for the shot (step 233). In a preferred embodiment, the last frame in each color histogram activity segment is selected as a key-frame.

If level D is selected (step 234), the motion activity detection process and color activity detection process discussed above are implemented for selecting key-frames (step 235 (referring to steps 212–225) and steps 227–233). It is to be understood that notwithstanding the process flow for level D as depicted in FIG. 2C, these processes may be performed one at a time (in any order) or in parallel.

After key-frame selection process is complete, the final step (as indicated above) is to eliminate visually similar key-frames (step 210, FIG. 2A). An elimination process in accordance with a preferred embodiment is based on based on histogram or perceptual color similarity (as discussed below). It is to be understood that key-frame selection processes described above may not generate visually different images in every instance. In some situations, several key-frames may not comprise "new" information, notwithstanding that there is significant motion activity or histogram activity among such key-frames. Furthermore, since an operating level (e.g., level D discussed above) may utilize a plurality of key-frame selection processes, the probability of having an overlap of selected key-frames (from the multiple processes) being visually similar increases.

Figure 3:
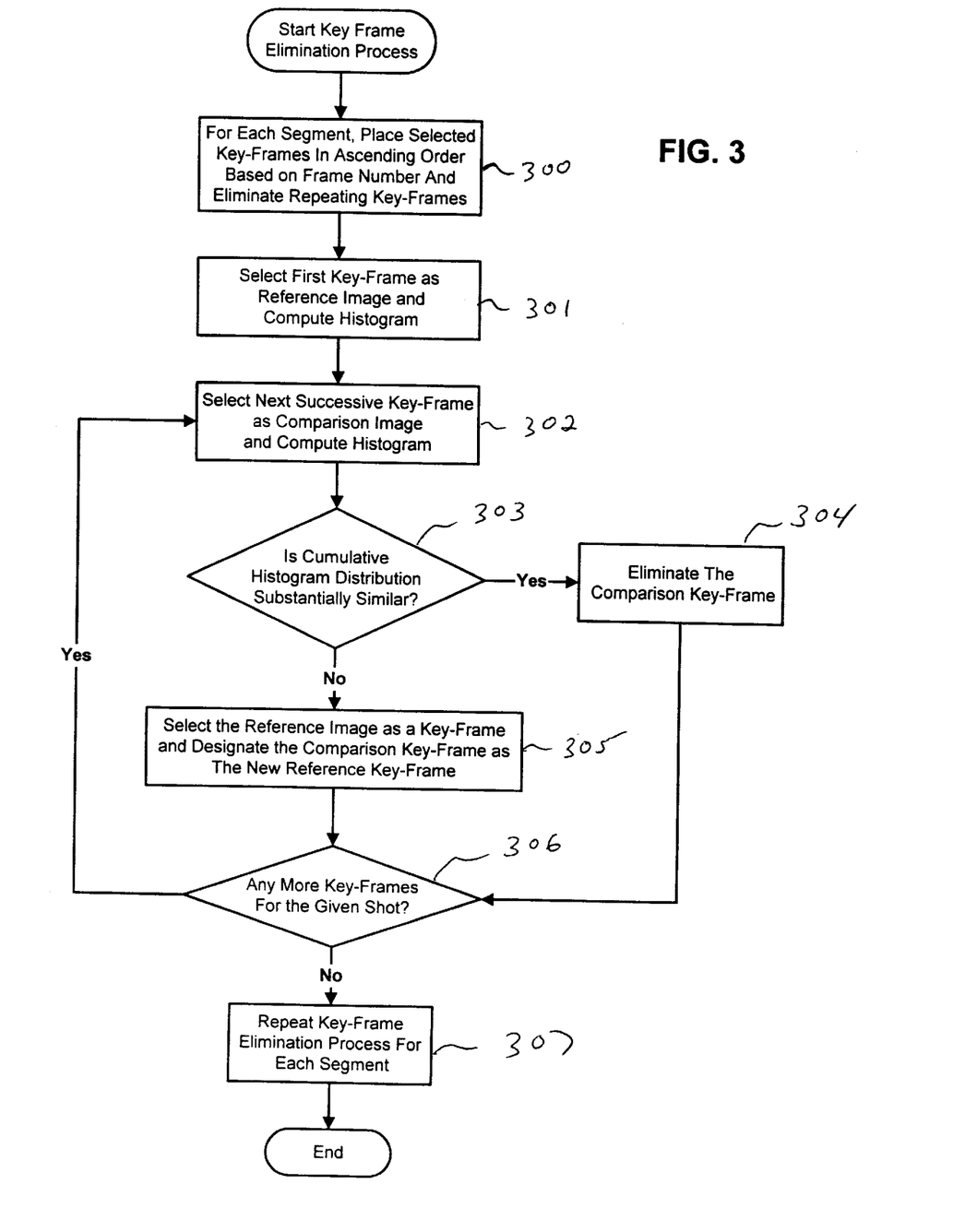
FIG. 3 illustrates a key-frame elimination method according to one aspect of the present invention.

Several key-frame elimination methods according to the present invention will now be discussed in detail with reference to the flow diagrams of FIGS. 3 and 4. The flow diagram of FIG. 3 depicts a key-frame elimination process based on histograms. Initially, for each video shot, each of the selected key-frames (resulting from a key-frame selection process) are listed in ascending order according to their frames number (in time) in the shot and the repeating key-frames are eliminated (step 300). The next step is to select a reference image (preferably the first key-frame in the ordered list) and compute its histogram (step 301). Then, the next successive key-frame in the ordered list is selected as a comparison image and its histogram is computed (step 302) using, e.g., the exemplary histogram computation process discussed above.

Next, the cumulative histogram distribution of the reference and comparison images are compared and if the cumulative histogram is substantially similar (affirmative result in step 303), the comparison key-frame is eliminated (step 304). On the other hand, if the cumulative histogram distribution is not substantially similar (negative result in step 303), then the reference key-frame is kept as a key-frame and the comparison image becomes the new reference image (step 305). If there are more unprocessed key-frames in the ordered list (affirmative result in step 306), then the next successive key-frame is selected as a comparison image and its histogram computed (return to step 302). This process is iterated for the given video shot until all key-frames in the ordered list are processed (negative result in step 306). This process is iterated for each video shot (step 307).

Figure 4:
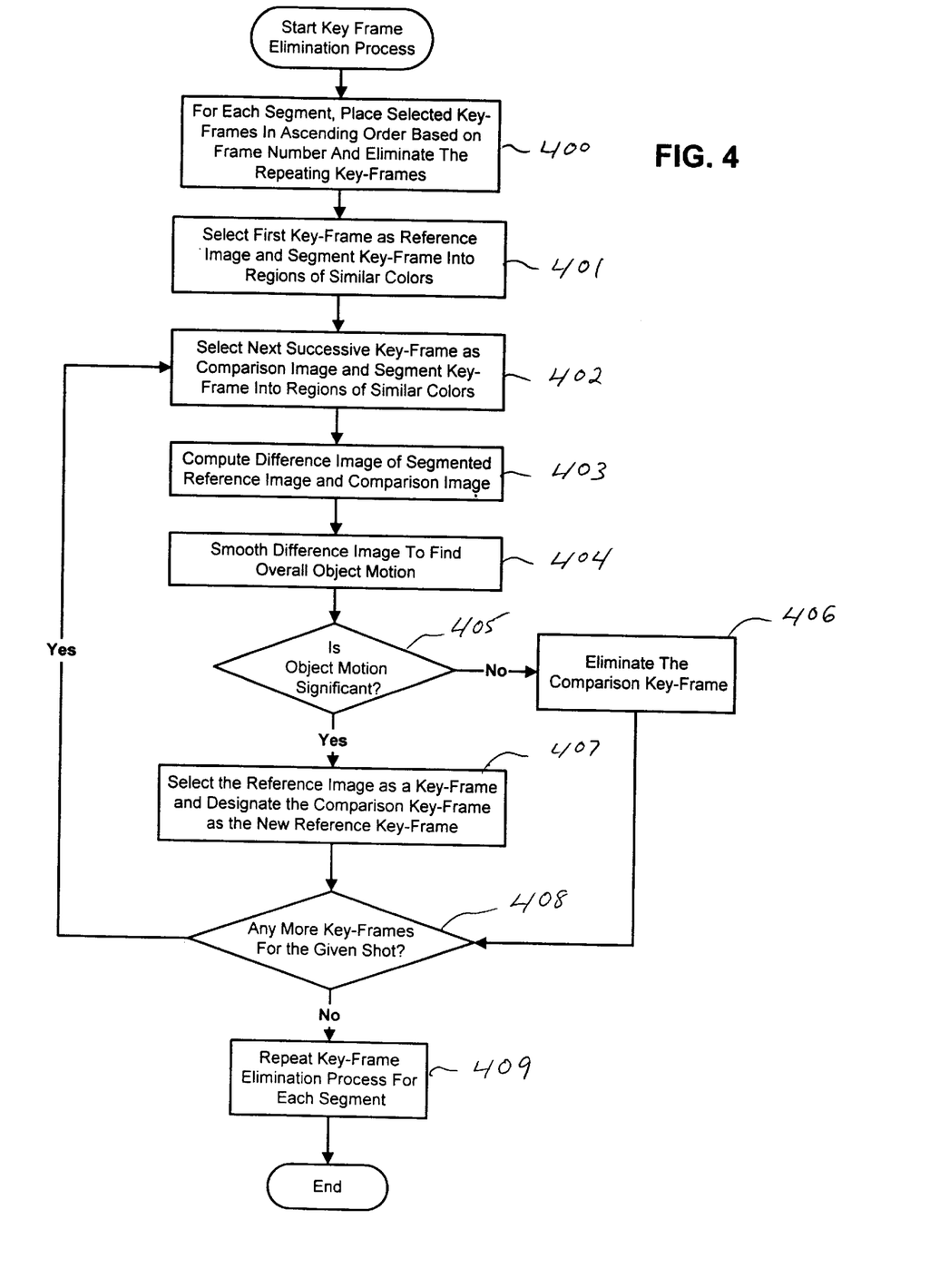
FIG. 4 illustrates a key-frame elimination method according to another aspect of the present invention.

Referring now to FIG. 4, a flow diagram illustrates a key-frame elimination method according to another aspect of the present invention. The process depicted in FIG. 4 is and object-based elimination method. Initially, for each video shot, each of the selected key-frames (resulting from a key-frame selection process) are listed in ascending order according to their frames number (in time) in the shot and the repeating key-frames are eliminated (step 400). The next step is to select a reference image (preferably the first key-frame in the ordered list) and segment the image into regions of similar colors (step 401).

Then, the next successive key-frame in the ordered list is selected as a comparison image and segmented into regions of similar colors (step 402). In one embodiment, this segmentation is performed as follows. First, the color histogram computation process as described above is implemented to compute the color histogram of the reference and comparison images and their corresponding label images are constructed. In particular, assuming IR(x,y) and IC(x,y) denote the reference and comparison images, respectively, then the corresponding color label images LR(x,y) and LC(x,y) are computed as follows:

LR(x,y)=j if G(IR(x,y))=j where j=1 . . . M and
LC(x,y)=j if G(IC(x,y))=j where j=1 . . . M.

With continued reference to FIG. 4, the next step is to compute a binary difference image between the segmented reference and comparison images (step 403) by comparing corresponding pixels. Two pixels are considered different/similar if their color label is different/similar (e.g., a difference is represented by logic "1" and a similarity is represented by logic "0"). The difference image is then morphologically smoothed to find the overall object motion (step 404). If the object motion is determined to be insignificant (negative result in step 405), then the comparison key-frame is eliminated (step 406). On the other hand, if the object motion is determined to be significant (affirmative decision in step 405), then the reference key-frame is eliminated and the comparison image becomes the new reference image (step 407). If there are more unprocessed key-frames in the ordered list (affirmative decision in step 408), the next successive key-frame is selected and segmented (return to step 402) and the process iterated for all key-frames in the ordered list. This process is repeated for each video shot (step 409).

It is to be appreciated that each of the above key frame elimination methods may be implemented alone or in parallel. If both methods are concurrently utilized, then a key-frame of a given shot will be eliminated if only one of the methods signals elimination of the comparison frame.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for selecting key-frames from video data, comprising the steps of:

partitioning video data into segments;

generating a temporal activity curve for dissimilarity measures based on one of frame differences, color histograms, camera motion, and a combination thereof, for each segment, wherein the step of generating a temporal activity curve for dissimilarity measures based on frame differences comprises the steps of computing an average of an absolute pixel-based intensity difference between consecutive frames in a given segment, and computing a cumulative sum of the average of the absolute pixel-based intensity differences for the frames of the given segment; and sampling the temporal activity curve to select at least one key-frame for each segment, wherein the step of sampling the temporal activity curve comprises the steps of selecting a first frame in the given segment as a key-frame, if the cumulative sum of the average of the absolute pixel-based intensity differences for the frames of the given segment does not exceed a first predefined threshold, and selecting a predefined number of key-frames in the given segment uniformly, if the cumulative sum of the average of the absolute pixel-based intensity differences for the frames of the given segment exceeds the first predefined threshold.

2. The method of claim 1, wherein the segments are video shots.

3. A method for selecting key-frames from video data, comprising the steps of:

partitioning video data into segments;

generating a temporal activity curve for dissimilarity measures based on one of frame differences, color histograms, camera motion, and a combination thereof, for each segment; and sampling the temporal activity curve to select at least one key-frame for each segment, wherein the step of generating a temporal activity curve for dissimilarity measures based on camera motion comprises the steps of:

estimating camera motion between consecutive frames in a given segment;

computing a motion activity curve based on the estimated camera motion for the given segment; and computing a binary motion activity curve by comparing the motion activity curve to a second predefined threshold on a frame-by-frame basis.

4. The method of claim 3, wherein the step of estimating camera motion comprises the step of estimating motion parameters comprising one of zooming, rotational, panning, tilting in a two-dimensional image plane, and a combination thereof.

5. The method of claim 3, wherein the step of sampling the temporal activity curve to select at least one key-frame comprises the steps of:
   smoothing the binary motion activity curve to detect motion activity segments within the given segment;
   selecting a first and last a frame of each detected motion activity segment as a key-frame;
   cumulatively summing the estimated camera motion of each frame in each detected motion activity segment; and
   selecting at least one additional frame in each detected motion activity segment as a key-frame if the cumulative sum of the estimated camera motion for a motion activity segment exceeds a third predefined threshold.

6. The method of claim 5, further comprising the step of selecting a first frame of a given segment, if there are no detected motion activity segments for the given segment.

7. A method for selecting key-frames from video data, comprising the steps of:
   partitioning video data into segments;
   generating a temporal activity curve for dissimilarity measures based on one of frame differences, color histograms, camera motion, and a combination thereof, for each segment; and
   sampling the temporal activity curve to select at least one key-frame for each segment, wherein the step of generating a temporal activity curve for dissimilarity measures based on color histograms comprises the steps of:
      computing a color histogram of each frame of a given segment;
      computing a moving average histogram of the given segment using the computed color histograms for each frame;
      generating a color histogram activity curve by computing a distance between the color histogram of each frame and the moving average histogram; and
      computing a binary color histogram activity curve by comparing a change in value of the color histogram activity curve between each consecutive frame of the given segment to a fourth predefined threshold value.

8. The method of claim 7, wherein the step of sampling the temporal activity curve to select key-frames comprises the steps of:
   smoothing the binary color histogram activity curve to detect color histogram activity segments; and
   selecting at least one representative frame of each detected color histogram activity segment as a key-frame for the given segment.

9. The method of claim 8, further comprising the step of selecting a first frame of a given segment, if there are no detected color histogram activity segments for the given segment.

10. The method of claim 1, further comprising the step of eliminating selected key-frames in each segment that are visually similar.

11. The method of claim 10 wherein the step of eliminating key-frames is based on one a comparison between histograms of the selected key-frames, a comparison of the spatial layout of the selected key-frames and a combination thereof.

12. A program storage device readable by a machine, tangibly embodying a program of instructions executable by the machine to perform method steps for selecting key-frames from video data, the method steps comprising:
   partitioning video data into segments;
   generating a temporal activity curve for dissimilarity measures based on one of frame differences, color histograms, camera motion, and a combination thereof, for each segment, wherein the step of generating a temporal activity curve for dissimilarity measures based on frame differences comprises computing an average of an absolute pixel-based intensity difference between consecutive frames in a given segment, and computing a cumulative sum of the average of the absolute pixel-based intensity differences for the frames of the given segment; and
   sampling the temporal activity curve to select at least one key-frame for each segment, wherein the step of sampling the temporal activity curve comprises selecting a first frame in the given segment as a key-frame, if the cumulative sum of the average of the absolute pixel-based intensity differences for the frames of the given segment does not exceed a first predefined threshold, and selecting a predefined number of key-frames in the given segment uniformly, if the cumulative sum of the average of the absolute pixel-based intensity differences for the frames of the given segment exceeds the first predefined threshold.

13. The program storage device of claim 12, wherein the segments are video shots.

14. A program storage device readable by a machine, tangibly embodying a program of instructions executable by the machine to perform method steps for selecting key-frames from video data, the method steps comprising:
   partitioning video data into segments;
   generating a temporal activity curve for dissimilarity measures based on one of frame differences, color histograms, camera motion, and a combination thereof, for each segment; and
   sampling the temporal activity curve to select at least one key-frame for each segment,
   wherein the instructions for performing the step of generating a temporal activity curve for dissimilarity measures based on camera motion comprise instructions for performing the steps of:
      estimating camera motion between consecutive frames in a given segment;
      computing a motion activity curve based on the estimated camera motion for the given segment; and
      computing a binary motion activity curve by comparing the motion activity curve to a second predefined threshold on a frame-by-frame basis.

15. The program storage device of claim 14, wherein the instructions for performing the step of estimating camera motion comprise instructions for performing the step of estimating motion parameters comprising one of zooming, rotational, panning, tilting in a two-dimensional image plane, and a combination thereof.

16. The program storage device of claim 14, wherein the instructions for performing the step of sampling the temporal activity curve to select at least one key-frame comprise instructions for performing the steps of:
   smoothing the binary motion activity curve to detect motion activity segments within the given segment;
   selecting a first and last a frame of each detected motion activity segment as a key-frame;
   cumulatively summing the estimated camera motion of each frame in each detected motion activity segment; and selecting at least one additional frame in each detected motion activity segment as a key-frame if the cumulative sum of the estimated camera motion exceeds a third predefined threshold.

17. The program storage device of claim 16, further comprising instructions for performing the step of selecting a first frame of a given segment, if there are no detected motion activity segments for the given segment.

18. A program storage device readable by a machine, tangibly embodying a program of instructions executable by the machine to perform method steps for selecting key-frames from video data, the method steps comprising:

partitioning video data into segments;

generating a temporal activity curve for dissimilarity measures based on one of frame differences, color histograms, camera motion, and a combination thereof, for each segment; and sampling the temporal activity curve to select at least one key-frame for each segment, wherein the instructions for performing the step of generating a temporal activity curve for dissimilarity measures based on color histograms comprise instructions for performing the steps of:

computing a color histogram of each frame of a given segment; computing a moving average histogram of the given segment using the computed color histograms for each frame;

generating a color histogram activity curve by computing a distance between the color histogram of each frame and the moving average histogram; and computing a binary color histogram activity curve by comparing a change in value of the color histogram activity curve between each consecutive frame of the given segment to a fourth predefined threshold value.

19. The program storage device of claim 18, wherein the instructions for performing the step of sampling the temporal activity curve to select key-frames comprise instructions for performing the steps of:

smoothing the binary color histogram activity curve to detect color histogram activity segments; and selecting at least one representative frame of each detected color histogram activity segment as a key-frame for the given segment.

20. The program storage device of claim 19, further comprising instructions for performing the step of selecting a first frame of a given segment, if there are no detected color histogram activity segments for the given segment.

21. The program storage device of claim 12, further comprising instructions for performing the step of eliminating selected key-frames in each segment that are visually similar.

22. The program storage device of claim 21, wherein the instructions for performing the step of eliminating key-frames comprise instructions for one of comparing histograms of the selected key-frames, comparing spatial layouts of the selected key-frames, and a combination thereof, to eliminate similar selected key-frames.

* * * * *